UNITED STATES PATENT OFFICE.

JESSE N. OWEN, OF BUTLER, MISSOURI.

FUEL COMPOSITION.

SPECIFICATION forming part of Letters Patent No. 379,490, dated March 13, 1888.

Application filed October 4, 1886. Serial No. 215,301. (No specimens.)

*To all whom it may concern:*

Be it known that I, JESSE N. OWEN, a citizen of the United States, residing at Butler, in the county of Bates and State of Missouri, have invented certain new and useful Improvements in the Process of Preparing and Preserving Fuel; and I do hereby declare the following to be a full, clear, and exact description of the invention, such as will enable others skilled in the art to which it appertains to make and use the same.

My invention consists of a composition of fuel, which will be fully described in the following specification and pointed out in the claim.

First I take an inflammable gum, as rosin, pitch, tar, &c., and bring it to the consistence of a thin paint by the use of an oil, spirit, or both, which cuts or dissolves the first substance. I then add sulphur dissolved in oil or other inflammable liquid, four ounces or more to the gallon. If the sulphur fumes are objectionable, I use less. For making this liquid compound, any inflammable rosin, pitch, tar, oils, spirits, or liquids may be used, provided they do not form an explosive compound. Next I take any porous cheap or waste substance and saturate it with the liquid compound. After draining the same, I press, twist, or cut it into any desired shape or form, (or add the liquid compound last, as may be desired.) For the purpose of solidifying these materials, paste or other adhesive substance is used. Pulverized limestone, ground shells, or bones, in quantities as desired, are used for rendering the heat more lasting and for preserving the heat in a latent form and radiating it after the other fuel is burned.

In preparing fuel out of green vegetation, weeds, and other plants, they are first placed in water until they have fermented or decayed sufficiently to work easily, then formed or pressed into shape, (first adding adhesive substance, as above stated, if needed,) then saturated with liquid compound, and drained and pressed. This fuel will produce more heat if burned before it is thoroughly dry. Thus cornstalks, weeds, straw, grass, cobs, peat, sod, vegetable-mold, refuse coal, and other waste and refuse matter may be prepared as above, and by so doing make a good and durable fuel, that can be easily transported and used in the place of other fuel. It may also be scented, if desired, by placing a perfume in the liquid.

Having thus described my invention, what I claim as new, and desire to secure by Letters Patent, is—

The herein-described fuel composition, consisting of rosin and a solvent for the same, sulphur, carbonaceous matter, as corn stalks or cobs, and powdered limestone or ground shells, in compact form, substantially as set forth.

In testimony whereof I affix my signature in presence of two witnesses.

JESSE N. OWEN.

Witnesses:
J. N. GIBSON,
A. F. HICKMAN.